US007228264B2

(12) United States Patent
Barrenscheen et al.

(10) Patent No.: US 7,228,264 B2
(45) Date of Patent: Jun. 5, 2007

(54) PROGRAM-CONTROLLED UNIT

(75) Inventors: Jens Barrenscheen, München (DE); Gunther Fenzl, Höhenkirchen (DE)

(73) Assignee: Infineon Technologies AG, Munich (DE)

( * ) Notice: Subject to any disclaimer, the term of this patent is extended or adjusted under 35 U.S.C. 154(b) by 700 days.

(21) Appl. No.: 10/116,171

(22) Filed: Apr. 4, 2002

(65) Prior Publication Data
US 2002/0194538 A1  Dec. 19, 2002

(30) Foreign Application Priority Data
Apr. 4, 2001 (DE) ................................ 101 16 861

(51) Int. Cl.
*G06F 9/455* (2006.01)
(52) U.S. Cl. ...................................... 703/23
(58) Field of Classification Search ................. 703/23, 703/28
See application file for complete search history.

(56) References Cited

U.S. PATENT DOCUMENTS

| 5,132,971 | A | * | 7/1992 | Oguma et al. ................. 714/28 |
| 5,640,542 | A |   | 6/1997 | Whitsel et al. |
| 5,872,953 | A | * | 2/1999 | Bailey ........................... 703/16 |
| 5,943,498 | A | * | 8/1999 | Yano et al. .................. 717/128 |
| 6,009,259 | A | * | 12/1999 | Ikeda et al. .................... 703/23 |
| 6,420,781 | B1 |   | 7/2002 | Wendorff et al. |
| 6,480,952 | B2 | * | 11/2002 | Gorishek et al. ............ 712/227 |
| 6,522,936 | B1 | * | 2/2003 | Hyodo et al. .................. 700/12 |
| 6,668,339 | B1 | * | 12/2003 | Maeda ......................... 714/38 |
| 6,711,684 | B1 | * | 3/2004 | Moroney et al. ............ 713/191 |
| 6,877,112 | B1 | * | 4/2005 | Iino et al. ...................... 714/23 |

FOREIGN PATENT DOCUMENTS

| DE | 37 37 958 A1 | 5/1988 |
| DE | 197 42 577 C1 | 11/1998 |
| DE | 197 43 264 A1 | 4/1999 |
| JP | 2000 347 942 | 12/2000 |

OTHER PUBLICATIONS

Huang et al.: "ICEBERG: An Embedded In-circuit Emulator Synthesizer for Microcontrollers", AMC 1999, pp. 580-585.

* cited by examiner

*Primary Examiner*—Paul Rodriguez
*Assistant Examiner*—Andre Pierre-Louis
(74) *Attorney, Agent, or Firm*—Laurence A. Greenberg; Werner H. Stemer; Ralph E. Locher

(57) ABSTRACT

A program-controlled unit includes a selection device which can determine whether the program-controlled unit is to be emulated by using a first emulation unit or by using a second emulation unit. As a result, it is possible to provide a mass production version of the program-controlled unit with an emulation unit having a reduced functional and/or performance scope. Therefore, an emulatable mass production version of the program-controlled unit can be made available which is only insignificantly more expensive, if at all, than a non-emulatable version.

15 Claims, 3 Drawing Sheets

PROGRAM-CONTROLLED UNIT

BACKGROUND OF THE INVENTION

Field of the Invention

The present invention relates to a program-controlled unit.

Program-controlled units such as microprocessors, microcontrollers and signal processors, etc. have been known in innumerable embodiments for many years and need no further explanation.

A known problem of program-controlled units is that it is often not simple to identify, localize and eliminate errors which occur.

For this purpose, use is often made of a so-called emulator. An emulator is able to identify the occurrence of predeterminable states or events and to react to the occurrence of the relevant state or event in a likewise predeterminable manner.

The predeterminable states or events include, for example, specific data, addresses or control signals being transferred or stored within or outside the program-controlled unit.

The predeterminable reactions to the occurrence of such or other states or events include, for example, the stopping of the program-controlled unit, the read-out and/or the alteration of the contents of registers or internal or external memories, and/or the recording and evaluation of profiles of data, addresses, signals of interest, and/or register and memory contents, which occur beforehand and/or afterward.

As is known, program-controlled units used in mass products, which are referred to below as mass production versions of the program-controlled unit for the sake of simplicity, cannot be emulated. That is because in those units there is only in part a possibility of access to the data, addresses, signals, registers and memories of interest, and because those units do not have the possibility of monitoring the occurrence of the states and events of interest in real time.

Therefore, special versions in particular of more complex program-controlled units, which are able to do this, are produced. Those special versions of the program-controlled units are referred to below as emulation versions of the program-controlled unit.

FIG. 1A shows a basic structure of the mass production version of a program-controlled unit, and FIG. 1B shows a structure of an emulation version of a program-controlled unit. These figures are described in greater detail below. It thus becomes clear that it is occasionally not possible or possible only with an enormous outlay to localize and eliminate unexpectedly occurring errors.

SUMMARY OF THE INVENTION

It is accordingly an object of the invention to provide a program-controlled unit, which overcomes the hereinaforementioned disadvantages of the heretofore-known devices of this general type, in which errors that occur can be localized and eliminated with a low outlay and which is not more expensive or is only slightly more expensive than a mass production version of a conventional program-controlled unit.

With the objects of the invention in view, there is also provided a program-controlled unit, comprising a first emulation unit and a second emulation unit. A selection device connected to the first and second emulation units determines which of the first and second emulation units is to be used for emulating the program-controlled unit.

This selection device makes it possible to provide a first emulation unit in the mass production version of the program-controlled unit, and to provide a further (second) emulation unit in the emulation version of the program-controlled unit. It also makes it possible to allow the control unit which controls the emulation to select the emulation unit which is to be used to effect emulation of the program-controlled unit.

As a result, it is also possible to emulate the mass production version of the program-controlled unit.

Since there is still a fully emulatable version of the program-controlled unit, there is no need for the first emulation unit provided in the mass production version to have to be able to perform everything that one or more emulation units of the emulation version have to be able to perform. In other words, the first emulation unit can be an emulation unit having limited functionality and/or limited performance. Such an emulation unit makes the mass production version of the program-controlled unit hardly any more expensive and nevertheless affords the possibility of emulating the mass production version to a certain extent.

A program-controlled unit constructed in the manner described above opens up the possibility of localizing and eliminating errors that occur in the mass production version through the use of emulation. The mass production version is only insignificantly, if at all, more expensive than the mass production version of a conventional program-controlled unit.

Other features which are considered as characteristic for the invention are set forth in the appended claims.

Although the invention is illustrated and described herein as embodied in a program-controlled unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
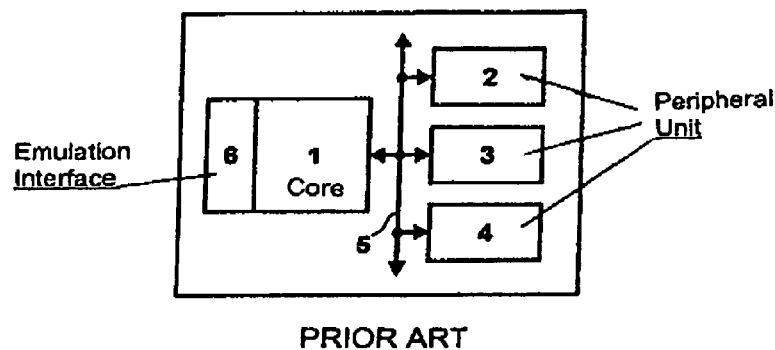
FIG. 1A is a block diagram of a conventional mass production version of a program-controlled unit.
Figure 1B:
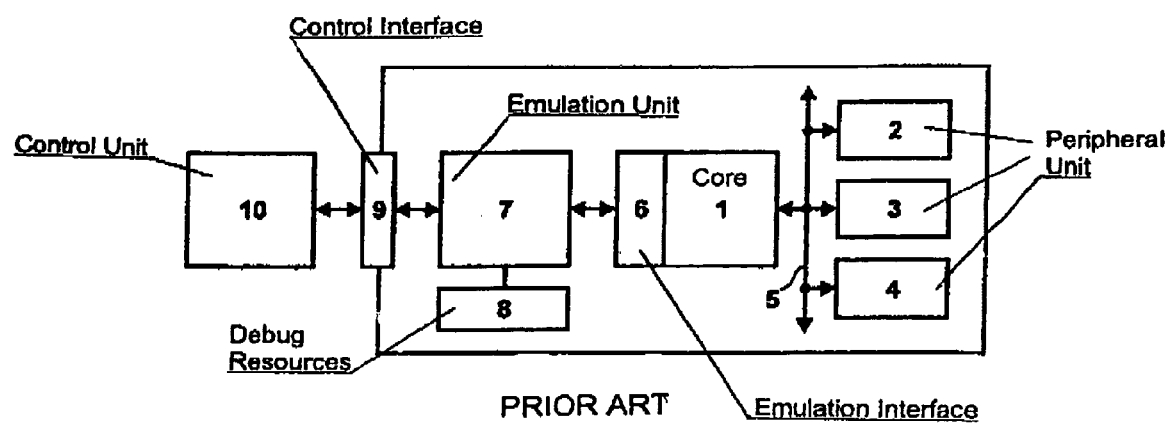
FIG. 1B is a block diagram of a conventional emulation version of a program-controlled unit.

Referring now to the figures of the drawings in detail and first, particularly, to FIGS. 1A and 1B thereof, it is seen that FIG. 1A shows a basic construction of a mass production version of a program-controlled unit, and FIG. 1B shows a construction of an emulation version of the program-controlled unit.

The mass production version shown in FIG. 1A contains a core 1, peripheral units 2, 3 and 4 such as, for example, a timer, an A/D converter, a memory, etc., as well as a bus 5 interconnecting the core 1 and the peripheral units 2, 3, and 4. The core 1 furthermore contains an emulation interface 6, through which an emulation unit provided in the emulation version of the program-controlled unit (see FIG. 1B) can be connected to the core 1.

The emulation version shown in FIG. 1B contains the mass production version, that is to say it likewise has the core 1, the peripheral units 2, 3 and 4, the bus 5 and the emulation interface 6. However, the emulation version also has components additionally required for the emulation. Those components include an emulation unit 7, debug resources 8 and a control interface 9, through which the emulation unit 7 can be connected to a control unit 10 that is provided outside the program-controlled unit and controls the emulation.

For the sake of completeness, it shall be noted that the emulation version of the program-controlled unit can include one or more semiconductor chips. In particular, the components required for the emulation can (but need not) be accommodated on a dedicated semiconductor chip which is connected to a chip containing the mass production version of the program-controlled unit. Such a program-controlled unit is described in German Published, Non-prosecuted Patent Application DE 197 43 264 A1.

The emulation unit 7 contains, for example, a so-called breakpoint or watchpoint logic. The logic is required in order to set states or events, the occurrence of which is to be monitored, and in order to identify the occurrence of the states or events being monitored.

The debug resources 8 contain, for example:
  a so-called overlay memory, in which it is possible to store programs and/or data that can be used during the emulation instead of the programs and/or data which are stored in the normally used memories; and
  a so-called monitor memory, in which debug sequences are stored that must be executed by the core in order to carry out specific actions required for the emulation.

As a result of the additional components contained in the emulation version, the emulation version of the program-controlled unit is more expensive than the mass production version and, for this reason, is generally used only in the development phase. The less expensive mass production versions of the program-controlled unit are normally used in fully developed and sold apparatuses.

However, the situation is not precluded in which errors that can be localized and eliminated only through the use of emulation can occur even in fully developed apparatuses. Nevertheless, emulation of the mass production version is not possible because it lacks the requisite components (emulation unit 7, debug resources 8 and interface 9).

Consequently, it is occasionally not possible, or possible only with an enormous outlay, to localize and eliminate unexpectedly occurring errors.

A program-controlled unit according to the invention, which is described below, is distinguished by the fact that it contains a selection device, that can define whether the program-controlled unit is to be emulated using a first emulation unit or using a second emulation unit.

Figure 2A:
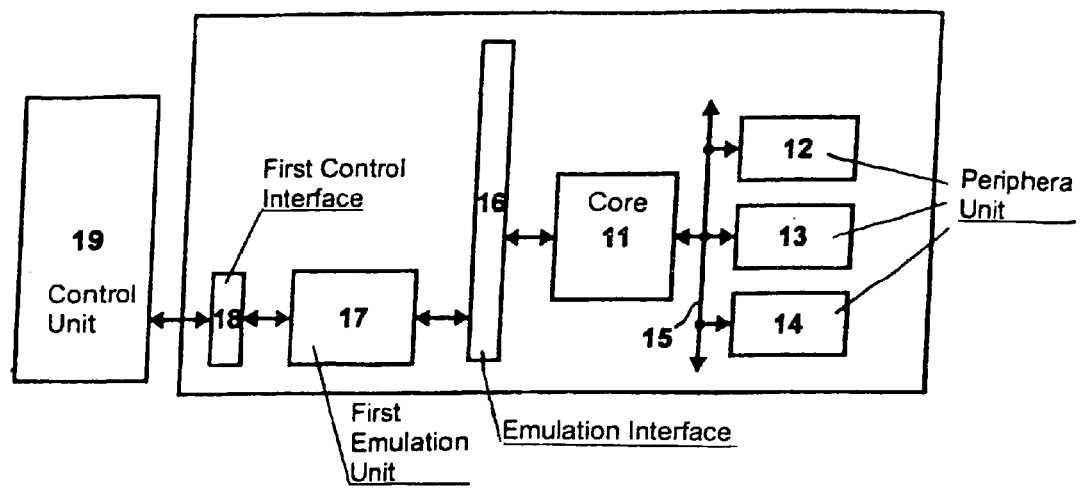
FIG. 2A is a block diagram of a mass production version of a program-controlled unit which will be described in more detail below.
Figure 2B:
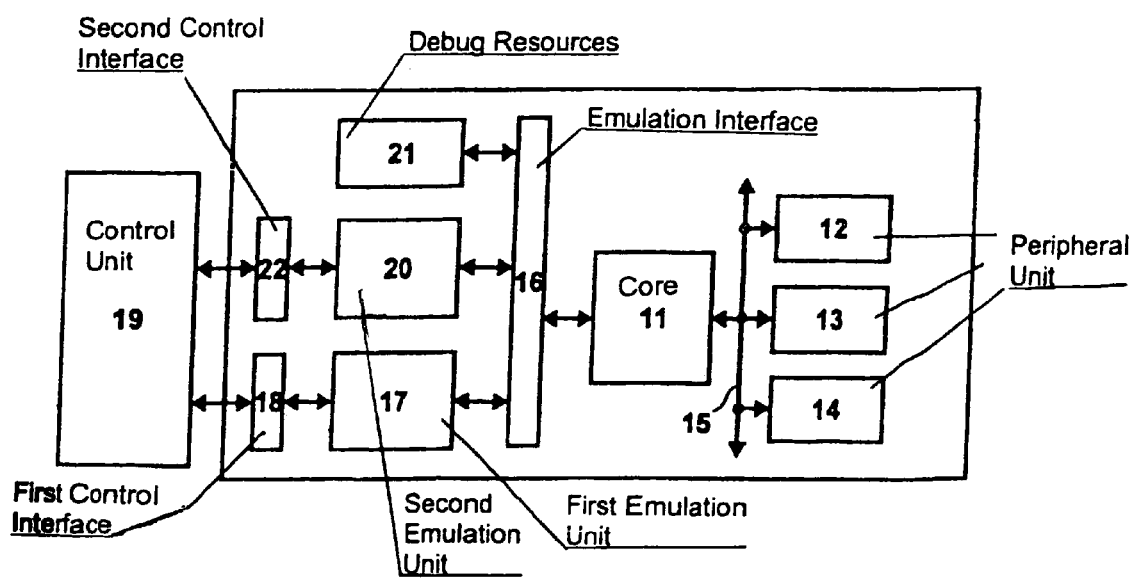
FIG. 2B is a block diagram of an emulation version of a program-controlled unit which will be described in more detail below.

A mass production version of such a program-controlled unit is shown in FIG. 2A, and an emulation version of such a program-controlled unit is shown in FIG. 2B.

Like the conventional mass production version shown in FIG. 1A, the mass production version of the program-controlled unit which is shown in FIG. 2A contains a core 11, peripheral units 12, 13 and 14 and a bus 15 interconnecting the core 11 and the peripheral units 12, 13 and 14. There is additionally provided a (first) emulation unit 17, an emulation interface 16 which is separate from the core 11 and is provided for connecting the first emulation unit 17 to the core 11, and a (first) control interface 18 for connecting the first emulation unit 17 to a control unit 19 that is provided outside the program-controlled unit and controls the emulation. The core 11, the peripheral units 12, 13 and 14, and the bus 15 correspond to the core 1, the peripheral units 2, 3 and 4 and the bus 5 of the configuration shown in FIG. 1A.

The emulation version of the program-controlled unit which is shown in FIG. 2B contains the components of the mass production version of the program-controlled unit that are shown in FIG. 2A and have been described with reference thereto. The emulation version of the program-controlled unit additionally contains a second emulation unit 20, debug resources 21 and a second control interface 22 for connecting the second emulation unit 20 to the control unit 19 which controls the emulation. The second emulation unit 20 and the debug resources 21 are connected to the core 11 through the same interface as the first emulation unit 17, namely through the emulation interface 16. The debug resources 21 correspond to the debug resources 8 of the emulation version in accordance with FIG. 1B. The second emulation unit 20 may correspond to the emulation unit 7 of the emulation version in accordance with FIG. 1B. However, as will be explained in more detail below, it preferably includes only part of the emulation unit 7, more precisely only those components which are not already contained in the first emulation unit 17.

The emulation interface 16 contains the selection device already mentioned above. The selection device can define whether the program-controlled unit is to be emulated by using a first emulation unit or by using a second emulation unit. In this case, the first emulation unit is the first emulation unit 17 and, in this case, the second emulation unit is the second emulation unit 20.

It should already be pointed out at this juncture that the selection device need not be a constituent part of the emulation interface 16. Instead, it may also be contained in another component of the program-controlled unit or be realized as a dedicated component of the program-controlled unit.

Figure 3:
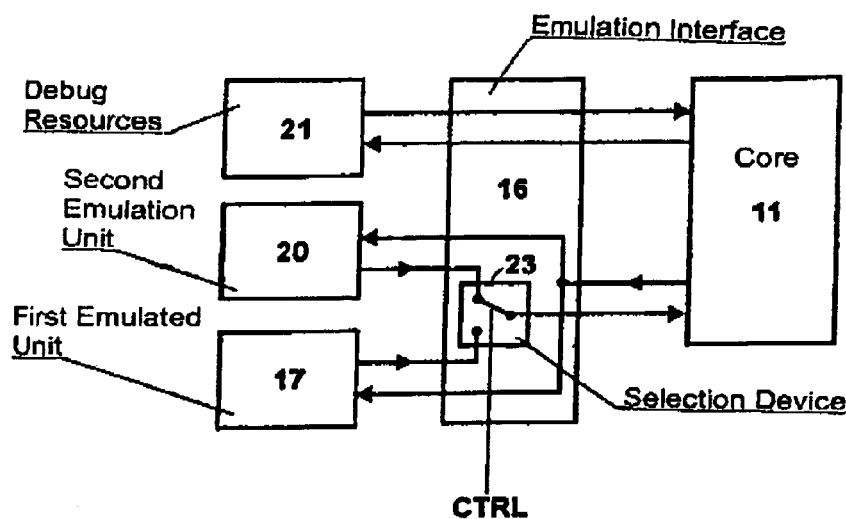
FIG. 3 is a block diagram illustrating the construction of an emulation interface of the program-controlled units shown in FIGS. 2A and 2B.

A possible construction of the emulation interface 16 and of the selection device contained therein is illustrated in FIG. 3.

The selection device is designated by reference symbol 23 in FIG. 3. In the example considered, what is involved is a changeover switch that is controlled by the control unit 19, for example through an input and/or output terminal (pin or pad) of the program-controlled unit or in some other way.

The selection device 23 decides whether a request output by the first emulation unit 17 or a request output by the second emulation unit 20 is forwarded to the core 11. Data returned from the core 11 in response to a request on the part of the first emulation unit 17 or in response to a request on the part of the second emulation unit 20 are fed both to the first emulation unit 17 and to the second emulation unit 20.

As has already been mentioned above, the first emulation unit 17 and the second emulation unit 20 preferably together have the same functional scope as the emulation unit 7 of the conventional emulation version of the program-controlled circuit in accordance with FIG. 1B. It becomes clear from this that the first emulation unit 17 has a smaller functional scope than the emulation unit 7 of the emulation version of the program-controlled unit in accordance with FIG. 1B. This, and moreover the circumstance whereby the mass production version of the program-controlled unit contains no debug resources, opens up the possibility of creating a mass production version of a program-controlled unit which can be emulated but costs only insignificantly more than a non-emulatable mass production version.

A further special feature of the program-controlled unit being considered is that such a unit has a security mechanism which prevents unauthorized persons from being able to read out secret data or programs from an internal memory device of the program-controlled unit by connecting a control unit 19 to the program-controlled unit.

Figure 4:
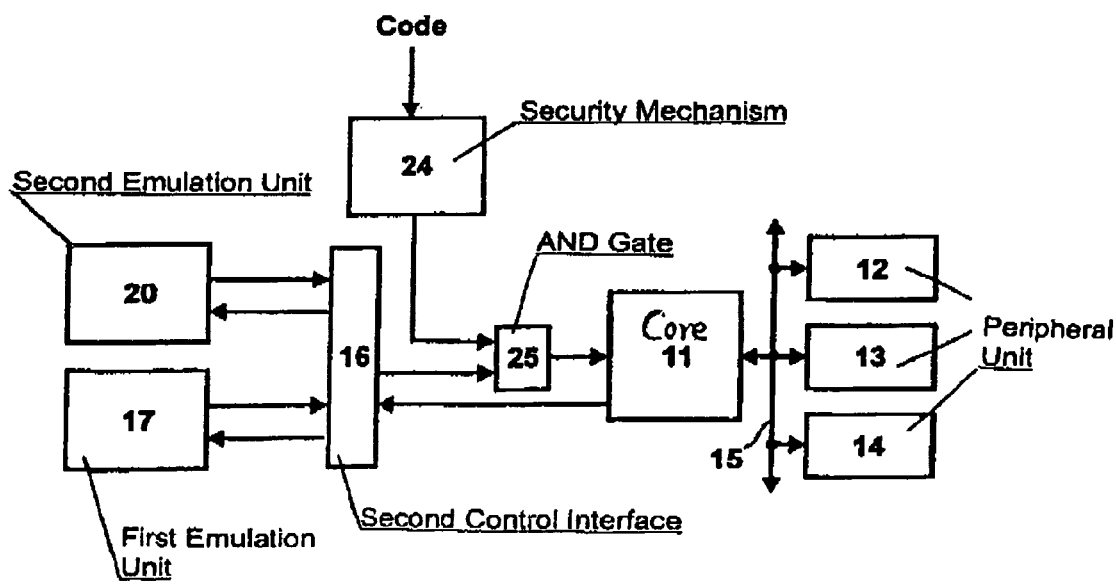
FIG. 4 is a block diagram of a security mechanism which can be used to prevent a situation wherein data are read from the program-controlled unit in an unauthorized manner through the emulation units of the program-controlled units shown in FIGS. 2A and 2B.

The construction of an emulation version of a program-controlled unit which has such a security mechanism is illustrated in FIG. 4.

The emulation version shown in FIG. 4 is based on the emulation version shown in FIG. 2B and components designated by the same reference symbols designate identical or mutually corresponding components. By comparison with the emulation version shown in FIG. 2B, the emulation version shown in FIG. 4 additionally has a security mechanism 24 and a disabling element formed by an AND gate 25 in the example being considered.

The AND gate 25 is provided between the emulation interface 16 and the core 11, more precisely in a signal path through which requests originating from the emulation units 17 and 20 are forwarded to the core 11. The AND gate 25 has two input terminals, to one of which the data output by the emulation interface 16 are fed, and to the other of which an enable signal of the security mechanism 24 is fed.

The AND gate 25 allows the request data forwarded from the emulation interface 16 to the core 11 to pass if and as long as the enable signal of the security mechanism 24 has the value 1, and disables the transfer of the request data to the core 11 if the enable signal has the value 0.

A specific code must be fed to the security mechanism 24 so that the enable signal generated by it assumes the value 1. If the correct code is not supplied, the enable signal has the value 0 and, even when an emulation version is involved, the program-controlled unit cannot be emulated and thus cannot be subjected to covert observation either. In the example considered, the specific code is fixedly set in the program-controlled unit and is disclosed only to quite specific persons, in particular to customer support personnel responsible for eliminating errors.

There are various possibilities for the inputting of the code. The inputting can be effected through specific input and/or output terminals of the program-controlled unit or through the control unit 19.

We claim:

1. A program-controlled unit, comprising:
    an emulation interface;
    a bus connecting to peripheral units;
    a core connected between said emulation interface and said bus;
    a first emulation unit;
    a second emulation unit;
    a selection device disposed in said emulation interface and connected to said first and second emulation units and to said core for determining which of said first and second emulation units emulates the program-controlled unit, said selection device deciding whether a request output by said first emulation unit or a request output by said second emulation unit is forwarded to said core; and
    said selection device being configured to provide data returned from said core in response to said request output by one of said first emulation unit and said second emulation unit to both of said first emulation unit and said second emulation unit.

2. The program-controlled unit according to claim 1, wherein said selection device is a changeover device for forwarding data or signals output optionally from said first and second emulation units to said core.

3. The program-controlled unit according to claim 1, wherein said selection device is controlled by a control unit provided outside the program-controlled unit.

4. A mass production program-controlled unit, comprising:
    an emulation unit containing limited functional scope, said emulation unit including less logic than the amount necessary to fully emulate the mass production program-controlled unit;
    an emulation interface connected to said emulation unit for using said emulation unit to emulate the mass production program-controlled unit;
    a bus connecting to peripheral units;
    a core connected between said emulation interface and said bus; and
    a control interface connecting said emulation unit to an external control unit.

5. An emulation program-controlled unit, comprising:
    an emulation interface;
    a bus connecting to peripheral units;
    a core connected between said emulation interface and said bus;
    a first emulation unit;
    a second emulation unit;
    a selection device disposed in said emulation interface and connected to said first and second emulation units and to said core for determining which of said first and second emulation units emulates the program-controlled unit, said selection device deciding whether a request output by said first emulation unit or a request output by said second emulation unit is forwarded to said core; and
    said selection device being configured to provide data returned from said core in response to said request output by one of said first emulation unit and said second emulation unit to both of said first emulation unit and said second emulation unit.

6. The emulation program-controlled unit according to claim 5, which further comprises debug resources.

7. The emulation program-controlled unit according to claim 6, wherein said debug resources contain a monitor memory.

8. The emulation program-controlled unit according to claim 6, wherein said debug resources contain an overlay memory.

9. The program-controlled unit according to claim 2, which further comprises an interface jointly utilized by said first and second emulation units and connected between said first and second emulation units and said core.

10. The program-controlled unit according to claim 9, wherein said selection device is a constituent part of said interface.

11. The program-controlled unit according to claim 1, which further comprises dedicated interfaces each connected between a respective one of said first and second emulation units and a control unit outside the program-controlled unit.

12. The program-controlled unit according to claim 2, which further comprises a security mechanism for interrupting a connection between said first and second emulation units and said core.

13. The program-controlled unit according to claim 12, wherein said security mechanism enables the connection between said first and second emulation units and said core only if a specific code has previously been fed to said security mechanism.

14. The program-controlled unit according to claim 12, which further comprises an AND gate for disabling and enabling the connection between said first and second emulation units and said core, said AND gate having an input terminal for receiving an enable signal from said security mechanism.

15. The program-controlled unit according to claim 13, which further comprises an AND gate for disabling and enabling the connection between said first and second emulation units and said core, said AND gate having an input terminal for receiving an enable signal from said security mechanism.

* * * * *